No. 881,909. PATENTED MAR. 17, 1908.
M. D. DRAKE.
WHEEL.
APPLICATION FILED MAY 18, 1907.
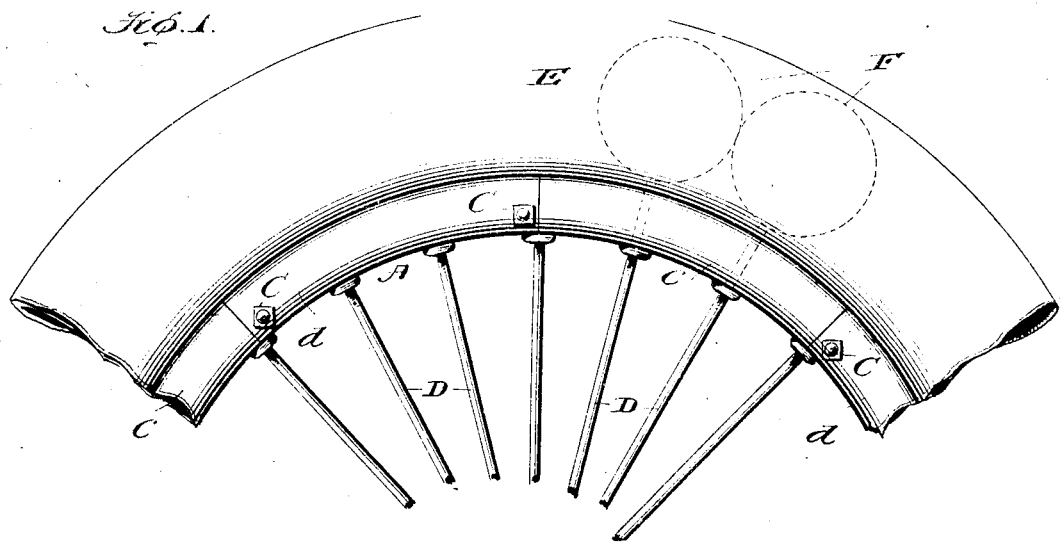
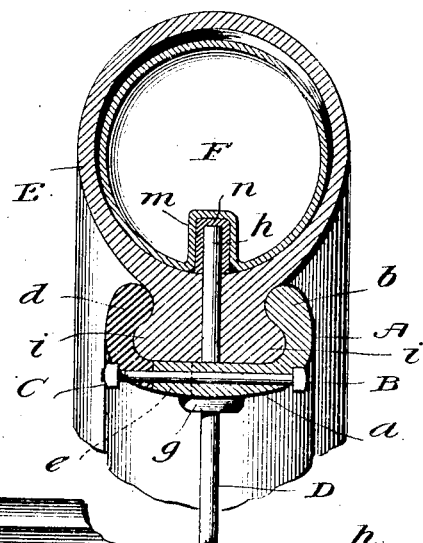
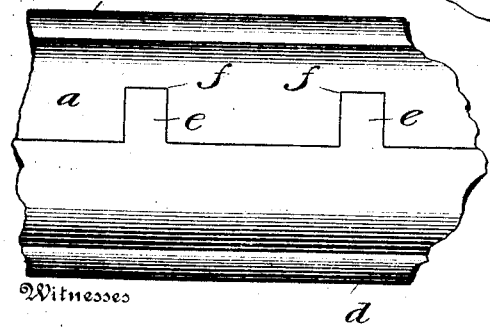
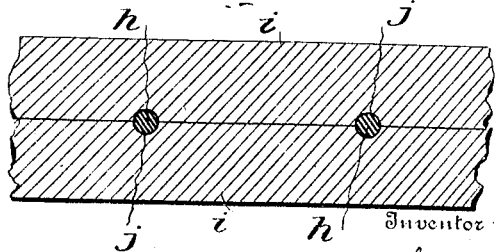
Witnesses
Wm C. Dashiell
J. J. Sheehy Jr.
Inventor
M. D. Drake
By James J Sheehy
Attorney

UNITED STATES PATENT OFFICE.

MARSHALL D. DRAKE, OF BEARD, KENTUCKY.

WHEEL

No. 881,909.

Specification of Letters Patent.  Patented March 17, 1908.

Application filed May 18, 1907. Serial No. 374,368.

*To all whom it may concern:*

Be it known that I, MARSHALL D. DRAKE, a citizen of the United States, residing at Beard, in the county of Oldham and State of Kentucky, have invented new and useful Improvements in Wheels, of which the following is a specification.

My invention pertains to wheels; and it contemplates the provision of a wheel designed for use in bicycles, automobiles and other vehicles, and embodying such a construction that it is possessed of great resiliency or springiness, is not liable to be materially impaired by a single puncture, is well adapted to resist lateral strain imposed on its tire and to withstand the hard usage to which vehicle wheels are ordinarily subjected, and is susceptible of being expeditiously, easily and inexpensively repaired without entailing the employment of skilled labor.

With the foregoing in mind the invention will be fully understood from the following description and claims when the same are read in connection with the accompanying drawings, forming part of this specification, in which:

Figure 1 is a side elevation of so much of a wheel as is necessary to illustrate the preferred embodiment of my invention. Fig. 2 is an enlarged transverse section taken through the rim and tire of the wheel and illustrating one spoke and one individual inflatable compartment in the tire, and the parts appurtenant to said spoke and inflatable compartment. Fig. 3 is an enlarged detail plan view showing a portion of the wheel rim and illustrating the manner in which one of the removable tire clenching sections of the rim is joined to the body or major portion of the rim. Fig. 4 is a detail section taken through the base of the tire cover and showing the manner in which the outer portions of the spokes are received between the portions of said base.

Similar letters designate corresponding parts in all of the views of the drawings, referring to which:

A is the rim of my novel wheel, which is made of material suitable to its purposes, and is preferably, though not necessarily, of the general shape in cross-section illustrated in Fig. 2. The said rim A is made up of a body $a$ which extends entirely around the wheel and is provided at one side with a continuous tire-holding flange $b$, and at its opposite side with a tire-holding flange $c$ from which segments of about the proportional size illustrated are removed, segmental tire clenching sections $d$ removably arranged in the spaces afforded by the removal of the before mentioned segments from the body $a$, and suitable means detachably connecting the segmental tire clenching sections with the body $a$. As shown in Fig. 1, the segmental tire clenching sections $d$ alternate with the portions of the flange $c$ integral with the body $a$, and the detachable connection of the said tire clenching sections is preferably effected through the medium of bolts B which extend through the body $a$ and receive the sections $d$ on their threaded portions, and nuts C mounted on the said bolts B and disposed at the outer sides of the sections $d$. By virtue of this construction all that is necessary to be done when for any reason a tire clenching section $d$ is to be removed, is to remove the nuts C complementary to the mentioned section $d$, and then draw the section laterally off the bolts B and away from the body $a$. With a view of interlocking the tire clenching sections $d$ with the body $a$ of the rim so as to remove strain from the bolts B and contribute to the strength and durability of the rim as a whole, I provide each tire clenching section $d$ with a plurality of lateral tongues $e$, and the body $a$ in the inner walls of its segmental recesses with notches $f$ of a shape and size to snugly receive the tongues $e$ as clearly shown in Fig. 3. Thus it will be seen that without interfering with the lateral removal and replacing of the tire clenching sections $d$ in the manner before described, the said sections $d$ are joined to the body $a$ so as to form a rim quite as strong and durable as a rim formed of one piece of material.

D D are the spokes of the wheel. These spokes are provided at the inner side of the rim body $a$ with enlargements or collars $g$, and are extended through and beyond the said rim body, as indicated by $h$ and best shown in Fig. 2.

E is the cover comprised in the resilient tire of my novel wheel, and F F are the individual inflatable compartments which in combination with the cover E form the said resilient tire. As clearly shown in Fig. 2, the base portions $i$ of the tire cover E are shaped to be securely held by the flanges of the rim A, and as clearly shown in Fig. 4 the said base portions $i$ rest close together except at the points where the spoke portions $h$ occur at which points the base portions $i$ are provided with opposed grooves $j$ of a size to snugly receive the said spoke portions. This construction and arrangement of parts is materially advantageous for the reason that it enables the base of the cover E to efficiently support and cushion the individual inflatable compartments F which will now be described in detail. The said individual compartments F are like the cover E preferably formed of rubber or other material possessed of the requisite resiliency, and are preferably in the form of hollow balls, and are, in the preferred embodiment of my invention, so arranged in the cover E that each individual inflatable compartment F touches or bears against the adjoining compartments F—i. e., the compartments F between which it is arranged. There may be and preferably is an inflatable compartment F to each spoke D, but this is not essential to the purposes of my invention, and hence without involving departure from the scope of my invention as claimed there may be one inflatable compartment F to a suitable plurality of spokes D. Each inflatable compartment F is provided at its side adjacent to the center of the wheel with a socket $m$ to receive the outer end of a spoke portion $h$, Fig. 2, and with a view of precluding cutting or other injury of the compartment F by the said spoke portion, I prefer to line the socket $m$ with a socket $n$, which latter is preferably of spun or other light metal and is of the shape of an inverted cup and of a size to snugly receive the end of the spoke portion $h$. In describing the compartments F as inflatable, it is my intention to impart the idea that the said individual compartments F may be filled with air and then sealed or else that the said compartments F may, without involving departure from the scope of my invention, be provided with means through which they may be inflated when occasion demands.

By reference to Fig. 2 it will be apparent that the extension of the spoke portions $h$ through the base of the tire cover E and into the individual compartments F is materially advantageous for the reason that the said spoke portions are enabled to assist materially in preventing lateral displacement of the tire as a whole from the rim, and are also enabled to prevent lateral deflection of the compartments F as well as to prevent the said compartments F creeping or casually changing their relative positions in the cover E.

It will be gathered from the foregoing that when my novel tire is punctured, the puncture will not affect more than one of the compartments F, and hence the resiliency of the tire and the efficiency of the wheel as a whole will not be seriously impaired. From this it follows that when a puncture occurs the party using the wheel may, if desired, reach a repair station without liability of injuring the wheel. It will also be gathered that when it is desired to remove one or more of the air-filled compartments F and replace the same with new compartments, the same may be readily accomplished by removing one of the tire clenching sections $d$ and then raising the portion of the cover E adjacent to the particular compartment or compartments F mentioned, since when the cover E is raised as stated the compartment or compartments F may be readily removed from their respective spokes and new compartments F may then be placed on the spokes. With this done the side of the tire cover is replaced in its original position, and the tire clenching section $d$ is positioned and secured on its bolts B and with respect to the rim body $a$, when the tire will be rendered as good as new.

Notwithstanding the fact that my novel tire and the parts of the wheel coöperating therewith are adapted to efficiently cushion a bicycle or other vehicle and this without liability of the tire being appreciably impaired by a single puncture, it will be noted that the wheel as a whole is simple and compact in construction as well as neat in appearance, and embodies no parts that are liable to get out of order after a short period of use.

The construction herein shown and described constitutes the preferred embodiment of my invention, but it is obvious that in practice various changes in the form, construction and relative arrangement of parts may be made within the scope of my invention as defined in the claims appended.

Having described my invention, what I claim and desire to secure by Letters-Patent, is:

1. The combination in a wheel, of a rim, a tire comprising a continuous cover held by the rim and resilient, inflated compartments arranged in the continuous cover; some of said compartments having sockets in their inner portions the inner ends of which sockets are closed whereby the same are isolated from the interiors of their respective compartments, and spokes extending through and bearing against the inner side of the rim and also extending radially outward beyond the rim and arranged in the said sockets of the inflated compartments and bearing against the end walls of the sockets.

2. The combination in a wheel, of a rim, a tire comprising a cover held by the rim and resilient air-filled compartments contained in the cover and having sockets in their portions adjacent to the rim, and also having metallic cups in said sockets, and devices fixed to and projecting radially from the rim and disposed in the said sockets of the air-filled compartments.

3. The combination in a wheel, of a rim having a detachable portion or section at one side, spokes extending through and outward beyond the body or major portion of the rim, and a tire comprising a cover having separable base portions held by the rim and also having grooves in the opposed faces of said base portions snugly receiving the extended portions of the spokes, and resilient air-filled compartments removably arranged in the cover and having sockets receiving the outwardly extended portions of the spokes.

4. The combination in a wheel, of a rim having detachable segmental clencher sections at one side and also having fixed flange portions intermediate the said detachable sections and means connecting the said detachable sections with its body or major portion, a tire comprising a cover having separable base portions held by the rim and resilient air-filled compartments removably arranged in the cover and having sockets in their portions adjacent to the rim, and devices projecting radially from the rim and disposed in the said sockets of the air-filled compartments.

In testimony whereof I have hereunto set my hand in presence of two subscribing witnesses.

MARSHALL D. DRAKE.

Witnesses:
THOMAS E. TURPIN,
JAMES J. SHEEHY, Jr.